United States Patent [19]

Martinek

[11] 4,244,133
[45] Jan. 13, 1981

[54] BARBED FISHING LURE WITH PIVOTED SPRING MEANS FOR ATTACHING A PLASTIC WORM THERETO

[75] Inventor: Michael A. Martinek, 1002 SW. 5th Ct., Boynton Beach, Fla.

[73] Assignee: Rockwell International Corporation, Segundo, Calif.

[21] Appl. No.: 31,183

[22] Filed: Apr. 18, 1979

[51] Int. Cl.³ .................... A01K 85/00; A01K 83/06
[52] U.S. Cl. ................. 43/42.25; 43/42.28; 43/42.37; 43/42.39
[58] Field of Search ........... 43/42.13, 42.24, 42.25, 43/42.28, 42.29, 42.37, 42.38, 42.39, 44.8, 44.81

[56] References Cited

U.S. PATENT DOCUMENTS

| | | | |
|---|---|---|---|
| 2,994,151 | 8/1961 | Webb | 43/42.37 X |
| 3,143,824 | 8/1964 | Thomas | 43/42.26 X |
| 3,293,790 | 12/1966 | Konomos | 43/44.2 |
| 3,897,647 | 8/1975 | Black | 43/42.38 |
| 3,990,171 | 11/1976 | Davis | 43/42.28 |
| 4,060,928 | 12/1977 | Messler | 43/42.24 |

Primary Examiner—Nicholas P. Godici
Attorney, Agent, or Firm—W. Britton Moore; Terry M. Blackwood; Richard A. Bachand

[57] ABSTRACT

An artificial fishing lure attachable to a line for bass fishing and the like having a curved barbed hook on one end for insertion in an elongated plastic worm, with the opposite end of the hook shank being coiled for sleevably receiving and retaining a reversely mounted hula skirt thereon. A flexible coiled spring is swivelly connected to the lure shank adjacent the hula skirt and is threadedly embedded in an end of and securely retains the worm on the lure when struck by a bass.

7 Claims, 5 Drawing Figures

BARBED FISHING LURE WITH PIVOTED SPRING MEANS FOR ATTACHING A PLASTIC WORM THERETO

BACKGROUND OF THE INVENTION

This invention relates to a fishing lure attachable to a line for bass fishing and having a barbed hook for insertion in a plastic worm, and a flexible coiled spring swiveled thereon and spacedly related to the hook for threadedly embedding in an end of and to anchor the worm thereon and prevent its dislodgment when taken by a fish.

While it has heretofore been proposed to provide barbed hook fishing lures with hula skirts and other appendages thereon and attaching plastic worms thereto, such as those represented by U.S. Pat. Nos. to Shindler 2,618,094, Woolfe 2,765,572, Thomas 3,143,824, Konomos 3,293,790, Messler 4,060,928, and Carpenter 4,094,087, none of these lures have been satisfactory for bass fishing because of the savage manner in which a bass takes and jerks the bait usually dislodging the hula skirts and plastic worms therefrom and resulting in its escape.

SUMMARY OF THE INVENTION

The principal object of the present invention is to provide a barbed artificial fishing lure for bass fishing, wherein the barbed hook may be inserted into the body of a plastic worm, and the opposing end of the shank is coiled for sleevably receiving and anchoring the collar of a reversely mounted hula skirt thereon, and a coiled spring is swivelly connected to the shank adjacent the hula skirt and is threadedly embedded in an end of and securely retains and anchors the worm thereon and precludes its dislodgment when struck by a bass. Another object is the provision of a weighted artificial fishing lure having a curved metal barbed hook on one end, and the other end of the hook shank being coiled for sleevably receiving and anchoring the collar of a hula skirt thereon, and wherein a coiled metal spring is swiveled to the skirt mounting end of the shank in spaced relation to the barbed hook so as to be adapted to be screwed and embedded in an end of the plastic worm to prevent its dislodgment.

Still another object is to provide a fishing lure with a curved metal barbed hook on one end, and a relatively short elongated and flexibly coiled metal spring swiveled to the opposing end of the hook shank so as to be manually screwed and embedded into an end of the plastic worm, after which the barbed hook may be inserted into the body thereof to securely anchor the worm thereon and prevent its dislodgment therefrom.

A further object is the provision of a weighted and weedless fishing lure having an elongated metal shank with an upwardly curved barbed hook on one end and a weighted and coiled wire portion on the other end for sleevably receiving and anchoring a hula skirt collar thereon, with a flexibly coiled metal spring swivelly attached to the weighted end whereby when the hook is attached to a plastic worm and, with the coiled spring threadedly embedded thereinto, the lure may be undulatingly trailed through the water with the worm uppermost and with the hook shank therebelow so as to slide over and prevent the lure from becoming entangled or ensnared with weeds or other bottom objects.

A still further object is to provide a fishing lure having a curved barbed hook and coiled portion thereon for reversedly and securely sleeving the collar of a rubber hula skirt thereon which is prevented from becoming dislodged, but which may be readily manually removed by compressing the collar to permit air to enter therebetween so that the skirt may be unscrewed therefrom.

Another object is the provision of a fishing lure wherein a plastic worm of floatation material is threadedly anchored to a pivoted coiled metal spring and to the barbed hook so the hook and worm will remain uppermost as it is trailed through the water, but wherein the strands of the reversely mounted hula skirt individually wiggle as a centipede and the worm undulates or hops and the rearwardly extending tail portion thereof wiggles somewhat like an eel to attract bass.

Still another object is to provide a fishing lure which enables spin or gig fishing when a spinner is attached to the line.

These and other objects and advantages will be apparent as the specification is considered with the accompanying drawings, wherein FIG. 1 is a perspective view of any bass fishing lure with a hula skirt sleeved on a coiled shank portion, the curved barbed hook inserted in the body of a plastic worm, and the swiveled coiled spring threadedly embedded in an end of the worm, in the inverted assembly and casting position, it being understood that the worm is reversed and will be uppermost in the water;

DETAILED DESCRIPTION

Figure 1:
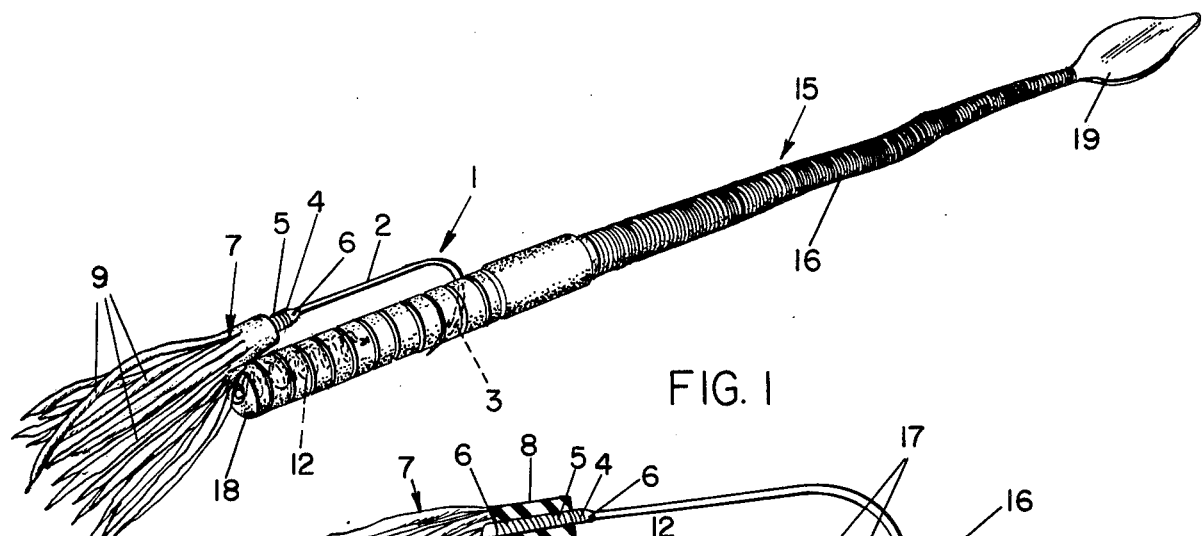

Referring more particularly to the drawings, wherein similar reference characters designate like parts throughout the several views, numeral 1 generally identifies a suitable metal hook including an elongated shank 2 which is curved downwardly and is barbed at one end, as at 3. The opposing end of shank 2 has a suitable length of flexible wire 4 tightly or closely coiled and would therearound to provide a threaded portion 5 which may be fixedly soldered or otherwise affixed thereto at its opposing ends, as at 6. A collar 8 of a conventional hula skirt 7 of rubber or the like, having a plurality of long slender strands 9 depending freely therefrom, is stretched and sleeved over the threaded or coiled wire portion 5 so that when fully positioned therearound the coils will intermesh with the collar 8 and securely prevent relative movement therebetween and serve to retain the collar and hula skirt in assembled position on the hook shank. In this connection, the skirt is reversely sleeved on the shank so that the strands 9 project forwardly from the line attached end of the hook and will wiggle or wave as a centipede as the lure is trailed through the water, as presently described.

Figure 2:
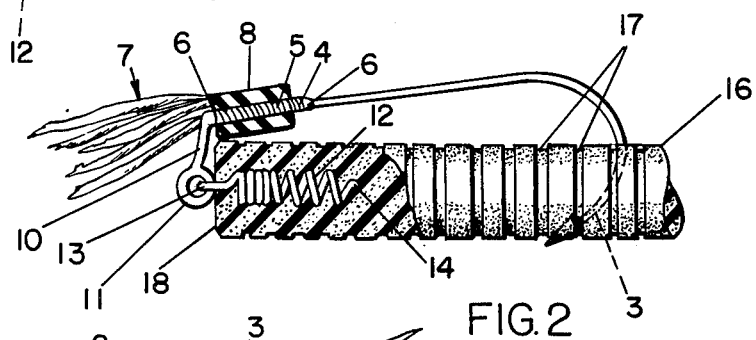
FIG. 2 is a side elevation, partly in section, of the FIG. 1 assemblage, and showing how the coiled spring is threadedly embedded in an end of the plastic worm.

The end of the hook shank 2 projecting beyond the coiled wire 4 is bent downwardly, as at 10, and is formed with an eyelet 11 for attaching the end of conventional fishing line, not shown, thereto in an obvious manner. Pivotally or swivelly attached to eyelet 11 is the looped upper end 13 of a flexible coiled metal spring 12, wherein the end of the lowermost convolution thereof may be sharpened or pointed, as at 14. A convention artificial worm 15 made from various rubber or plastic compounds and including an elongated body 16 with a ridged back portion 17 and blunted leading end portion 18 and a flattened trailing end portion 19 is adapted to be attached to the barbed hook, as now will be described. Thus, the pointed end 14 of the coiled metal spring 12 is impressed into the blunted leading end 18 of the plastic worm 15 and the latter is grasped by the fingers of the user and is rotated therearound and relative to the spring so that the latter will thread longitudinally thereinto, in the manner of a cork screw, until the spring is fully embedded therein and secured thereto, in an obvious manner, as best shown in FIG. 2. The leading end of the worm is thereby securely anchored to the coil spring 12 and cannot be dislodged therefrom, without first being unthreaded by rotation of the worm in an opposing direction. The barbed end 3 of the hook may then be pushed into the body of the worm in spaced relation to the spring so that the worm is secured thereon and cannot be dislodged when a bass takes the same.

When assembling a hula skirt and plastic worm on the lure, the shank 2 is grasped by the fingers of one hand with the barbed hook 3 downwardly extending, and the hula skirt collar 8 is reversely sleeved on the coiled wire end 4 of the shank. The coiled metal spring 12 is then threadedly embedded into the leading end 18 of the worm, after which the barbed end 3 of the hook is pushed downwardly into and through the body of the worm until the barbed point slightly protrudes through the opposite side thereof. In this assembled position of FIGS. 1 and 2, the hula skirt and hook shank is uppermost, and the elongated plastic worm is lowermost and projects rearwardly thereof. As the lure eyelet 11 is attached to the fishing line, the line and lure are then cast and, when the lure contacts and sinks in the water, the inherent buoyancy of the plastic worm will result in the latter righting itself until it is uppermost, or the reverse of the positions shown in FIGS. 1 and 2, at which position it will remain while immersed in the water. As the line and lure are trolled through the water, the hula skirt strands 9 flare outwardly and rearwardly and individually wiggle as a centipede to attract bass. In addition, the worm tends to undulate or hop with the flat tail wiggling as an eel, which will also attract fish.

Figure 3:
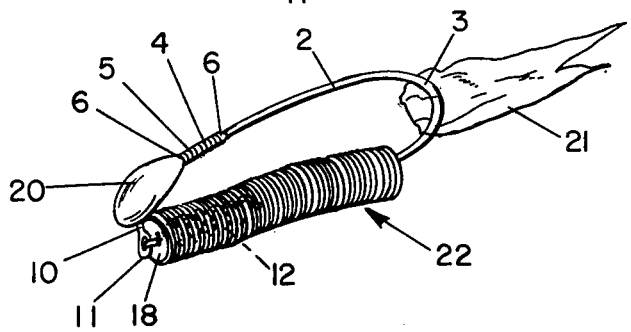
FIG. 3 is a perspective view of a weighted weedless embodiment, without a hula skirt thereon, but including a pork rind appendage, and with a reduced length of plastic worm thereon, and wherein the lure is shown in the same inverted assembly or casting position.

In the embodiment of FIG. 3, a generally oval shaped lead weight 20 is suitably affixed on the bent end of the hook shank 2 and is interposed between the forward end of the coiled wire shank portion 4 and line connecting eyelet 11. Either a hula skirt may be arranged on the coiled wire portion 4, as in FIGS. 1 and 2, or a tail of feathers, hair, or plastic, not shown, may be substituted for the hula skirt, and pork rind or the like 21 may be suitably attached to the curved hook end so as to trail and flutter therefrom as the lure is trolled through the water. In this embodiment, the flexible coiled metal spring 12 swivelly attached to eyelet 11 is threadedly embedded in the leading end of a relatively short length 22 of plastic worm, and the barbed hook 3 extends into the trailing end thereof. Thus, as the worm will be uppermost in the water and the weighted hook shank will be lowermost, the hook becomes weedless in that it will glide over and avoid becoming entangled with weeds, rocks and other objects.

Figure 4:
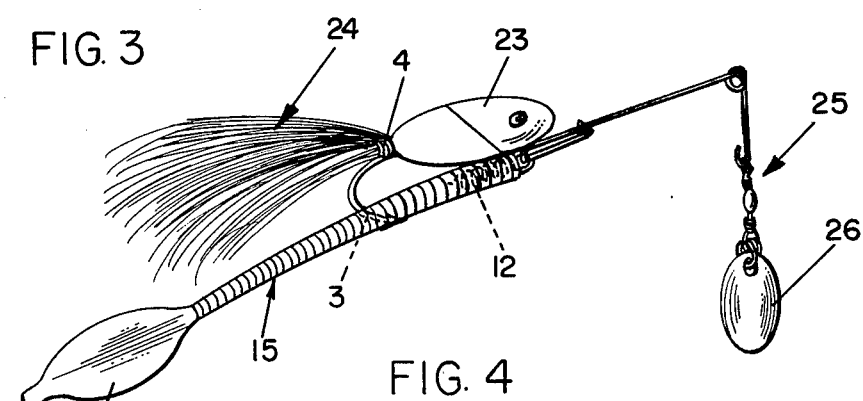
FIG. 4 is a perspective view of another embodiment wherein the hook shank has an oval shaped weight thereon simulating a minnow, and a spinner rig is attached thereto.

Another embodiment is illustrated in FIG. 4, wherein the lead weight extends over the main portion of the hook shank and generally simulates the contour of a small minnow, as at 23. The coiled wire portion 4 is arranged adjacent the curved barbed end of the shank and a suitable tail 24 of feathers, hair, or plastic may be attached to the coiled portion, as is the hula skirt in the embodiment of FIGS. 1 and 2. A suitable spinning rig 25 may be attached to eyelet 11 so as to project forwardly of the lure and is provided with a suitable spinner 26 depending therefrom which enables the lure to be used to spin or gig fish. The same elongated plastic worm, as shown in FIGS. 1 and 2, may be arranged on this lure.

Figure 5:
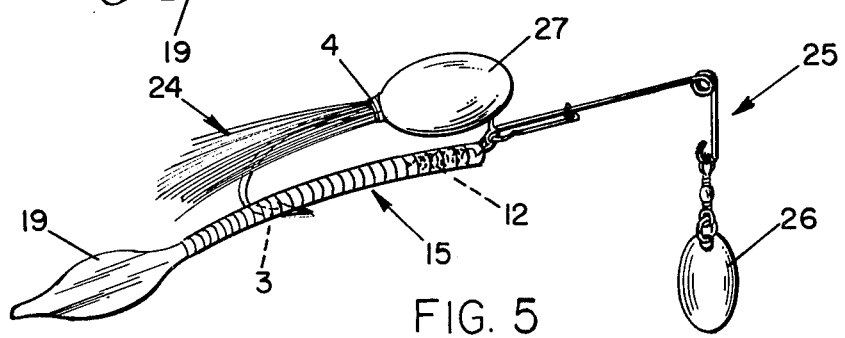
FIG. 5 is a perspective view of another embodiment with a smaller weight arranged thereon.

In lieu of the minnow shaped lead weight 23 of FIG. 4, a smaller oval weight 27 may be arranged on the forward end of the hook shank, as depicted in FIG. 5, and the coiled wire shank portion thereon serves as a support for the same appendage feathers, as in FIG. 4. The coiled metal spring 12, swiveled to the eyelet 11, is embedded in the leading end of an elongated plastic worm 15, and the barbed hook extends through the body thereof.

When it is desired to remove and/or replace a hula skirt or other appendage from the coiled wire shank portion, the rubber collar 8 may be compressed or squeezed with the fingers which causes the ends thereof to flare or expand and provide spaces for the entry of air between the collar and coiled wire shank so that the collar and skirt may be readily unscrewed therefrom.

While various embodiments have been shown and described, it is to be understood that various other embodiments and improvements may be made without departing from the scope and spirit of the appended claims.

What I claim is:

1. An artificial fishing lure attachable to a line for bass fishing and the like comprising an elongated metal shank having a curved barbed hook at the trailing end thereof, spiraled mounting means arranged on and extending around and affixed to the opposing and leading end of said shank for mounting hula skirt means thereon with a plurality of depending strands, flexible coiled metal spring means swivelly connected to the leading end of said shank adjacent said hula skirt wire mounting means, said spring means being threadedly screwed into and embedded in the leading end of an elongated flexible plastic worm, and said barbed hook extending into the body of said worm whereby said worm extends between and is supported by and between said spring means and said hook, and said worm will be uppermost and said shank and hook lowermost when said lure is trailed through the water.

2. An artificial fishing lure according to claim 1, wherein said wire mounting means is closely and tightly coiled around the leading end of said shank to provide threads for sleevably receiving and mounting a hula skirt thereon.

3. An artificial fishing lure according to claim 2, wherein said hula skirt is rubber and includes a mounting collar, and said collar is sleeved on said wire mounting means.

4. An artificial fishing lure according to claim 1, wherein the leading end of said shank is bent angularly downwardly eyelet means on the lower end of said bent end, and said spring means is swiveled to said eyelet means.

5. An artificial fishing lure according to claim 4, wherein the lowermost convolution of said metal spring means is pointed for entry into the leading end of said plastic worm whereby rotation of said worm causes said spring means to be threadedly embedded thereinto and said worm anchored thereon.

6. An artificial fishing lure according to claim 4, wherein weight means is arranged on the bent end of said shank between said coiled wire mounting means and the swivel connection for said spring means.

7. An artificial fishing lure according to claim 4, wherein spinner rig means is pivotally attached to said eyelet means whereby said lure is adapted for spin or gig fishing.

* * * * *

UNITED STATES PATENT AND TRADEMARK OFFICE
CERTIFICATE OF CORRECTION

PATENT NO. : 4,244,133
DATED : January 13, 1981
INVENTOR(S) : Michael A. Martinek It is certified that error appears in the above—identified patent and that said Letters Patent is hereby corrected as shown below:

On the cover sheet delete " (73) Assignee: Rockwell International Corporation, Segundo, Calif."

Signed and Sealed this

Seventh Day of July 1981

[SEAL]

Attest:

RENE D. TEGTMEYER

Attesting Officer     Acting Commissioner of Patents and Trademarks